(12) United States Patent
Dove

(10) Patent No.: US 11,705,939 B2
(45) Date of Patent: Jul. 18, 2023

(54) DUAL CAVITY, LOW POWER, OUTDOOR COMBINATION LINE AMPLIFIER PACKAGE FOR CABLE TELECOMMUNICATION SYSTEMS

(71) Applicant: Donald Charles Dove, Seattle, WA (US)

(72) Inventor: Donald Charles Dove, Seattle, WA (US)

(73) Assignees: SANMU LTD., Taipei (TW); 3MU LLC, Seattle, WA (US)

( * ) Notice: Subject to any disclaimer, the term of this patent is extended or adjusted under 35 U.S.C. 154(b) by 1 day.

(21) Appl. No.: 17/588,164

(22) Filed: Jan. 28, 2022

(65) Prior Publication Data

US 2022/0337287 A1    Oct. 20, 2022

Related U.S. Application Data

(60) Provisional application No. 63/176,390, filed on Apr. 19, 2021.

(51) Int. Cl.
| | |
|---|---|
| *H04B 3/02* | (2006.01) |
| *H04B 3/36* | (2006.01) |
| *H04B 3/54* | (2006.01) |

(52) U.S. Cl.
CPC ............. *H04B 3/548* (2013.01); *H04B 3/542* (2013.01); *H04B 2203/5425* (2013.01); *H04B 2203/5483* (2013.01)

(58) Field of Classification Search
CPC . H04B 3/02; H04B 3/36; H04B 3/542; H04B 3/548; H04B 2203/5425; H04B 2203/5483
See application file for complete search history.

(56) References Cited

U.S. PATENT DOCUMENTS

| 11,109,497 B2 * | 8/2021 | Al-Banna | ............ H05K 5/0226 |
| 2013/0157885 A1 * | 6/2013 | Spizz | ................... C12Q 1/6874 |
| | | | 506/9 |

FOREIGN PATENT DOCUMENTS

| WO | WO-2005091980 A2 * | 10/2005 | ............ H03H 11/36 |
| WO | WO-2020101870 A1 * | 5/2020 | ............ G02B 6/4206 |

* cited by examiner

*Primary Examiner* — Blane J Jackson
(74) *Attorney, Agent, or Firm* — Che-Yang Chen; Law Office of Michael Chen

(57) ABSTRACT

A dual cavity, low power, outdoor combination line amplifier package for cable telecommunication systems is disclosed. It comprises: a dual-cavity main frame, cast in one piece and sectioned into an upper cavity and a lower cavity; a hardline entry cover, having a hardline receptacle PCB with a power supply fixed thereon, electrically and environmentally sealing on one side of the upper cavity; a tap plate cover, having a tap plate PCB fixed thereon and mounted with a plurality of taps, electrically and environmentally sealing on the other side of the upper cavity with the taps facing externally; a gain module heatsink cover, having a gain module PCB and a passive PCB fixed thereon, electrically and environmentally sealing on one side of the lower cavity; and a smart app accessories cover, having a smart access cover PCB fixed thereon, electrically and environmentally sealing on the other side of the lower cavity.

8 Claims, 11 Drawing Sheets

DUAL CAVITY, LOW POWER, OUTDOOR COMBINATION LINE AMPLIFIER PACKAGE FOR CABLE TELECOMMUNICATION SYSTEMS

CROSS-REFERENCE TO RELATED APPLICATION

This application claims priority to, and the benefit of, U.S. Provisional Application No. 63/176,390 ("DUAL CAVITY, LOW POWER, OUTDOOR COMBINATION LINE AMPLIFIER/TAP FOR CABLE TELECOMMUNICATIONS SYSTEMS COMPRISING BROADBAND SIGNALS FROM 5 MHZ TO 3 GHZ"), filed on Apr. 19, 2021, the entire content of which is incorporated herein by reference.

FIELD OF THE INVENTION

The present invention relates to Cable Telecommunication (CATV) outdoor line amplifiers and outdoor taps. More particularly, the invention relates to closely spaced low power, low output level line amplifiers that operate in the radio frequency (RF) and microwave frequency range.

BACKGROUND OF THE INVENTION

In the cable television industry, the ever-increasing need for more bandwidth to support increasingly sophisticated bandwidth intensive services has led to the need to upgrade the outside plant line amplifiers every 5 to 7 years to support. As the demand for bandwidth increases, so does the upper frequency limit required to supply that additional bandwidth. To overcome the higher losses of the coaxial cable at the higher upper frequency limit, at each new generation, line amplifier manufacturers have been increasing the gain and output level along a linear slope line in the frequency domain. The higher RF output levels, along with the need for better amplifier distortion performance to support the broader RF spectrum's increased RF power load, proportionately increases the line power demand on the coaxial plant's Alternating Current (AC) power packs.

In using the same amplifier spacing, system operators prefer to employ these generational amplifier upgrades using form-factor equivalent (drop-in) line amplifier modules instead of replacing the entire amplifier housing; however, the increased line power demand of the new module also imposes higher thermal stress on the active RF gain blocks when compared to the previous generation.

Under prior art it is possible to accomplish outside plant bandwidth extensions without the penalty of higher output power devices by reducing the spacing intervals between amplifiers so the cable losses at least match that of the previous generation and preferably even less; however, system operators are reluctant to shorten the spacing between amplifiers because it requires system redesign involving practical complexities such as obtaining permits to place additional outdoor pedestals or excavations to place new underground vaults to accommodate the additional amplifier stations; or the inconvenience of splicing in new housings in to the coaxial aerial plant.

Another perception of shorter spacing is that the increased number of amplifier stations required to reach the same number of subscribers will lead to an overall reduction in system reliability. Still another perception of shorter spacing is that the increased number of amplifier stations would increase the power demand on the AC power packs.

Prior art allows for separation of upstream and downstream signals using Frequency Division Duplexing (FDD), a method where a common RF path is separated into two paths, one being isolated from another via a passive lumped element network where one path passes lower frequencies and blocks higher frequencies and the other path passes higher frequencies and blocks lower frequencies. Typically, diplex filters are plug-in modules, placed near each input and output of an amplifier station. Changing the frequency split in prior art involves changing each of these plug-in modules, including their associated auxiliary equalization modules, and other minor accessories to affect the new frequency split; a process often too involved to accomplish in the field while the amplifier module is still installed in the station.

Prior art allows for an alternative to FDD known as FDX (Full Duplex), the purpose of which is to allow simultaneous loading of a certain range of the upstream and downstream path. This can be enacted through echo cancelling circulators in place of diplex filter locations or by way of digital duplexing of a certain bandwidth.

In ordinary practice prior art allows for line amplifier bandwidth extensions by changing the entire amplifier module within the outer station. Alternately, system operators hire the services of a third party to upgrade the amplifier modules, usually by a process that requires resoldering, patching in new printed circuit boards, and changing gain blocks to newer technology. Usually, maintenance of the amplifier requires a complete module change as well.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

A dual cavity, low power, outdoor combination line amplifier package for cable telecommunication systems is disclosed. It comprises: a dual-cavity main frame, cast in one piece and sectioned into an upper cavity and a lower cavity; a hardline entry cover, having a hardline receptacle Printed Circuit Board (PCB) with a power supply fixed thereon, electrically and environmentally sealing on one side of the upper cavity; a tap plate cover, having a tap plate PCB fixed thereon and mounted with a plurality of taps, electrically and environmentally sealing on the other side of the upper cavity with the taps facing externally; a gain module heatsink cover, having a gain module PCB and a passive PCB fixed thereon, electrically and environmentally sealing on one side of the lower cavity; and a smart app accessories cover, having a smart access cover PCB fixed thereon, electrically and environmentally sealing on the other side of the lower cavity. One cavity is electromagnetically, acoustically, and thermally isolated from the other. The hardline receptacle PCB comprises AC, RF, and pass-through circuitry, providing electrical connection to coaxial cables in the downstream direction and the upstream direction to receive and transmit RF signal groups.

The tap plate PCB comprises AC accessory, taking samples of RF signal groups and dividing them over a plurality of subscriber ports in the downstream direction, and combining RF signal groups from a plurality of subscriber ports and coupling the combined RF signal groups to a main RF signal port in the upstream direction. The gain module PCB comprises gain circuitry, providing amplification of the RF signal groups in both downstream and upstream. The passive PCB separates, equalizes, filters and recombines RF signal groups in the downstream and upstream. The smart access cover PCB comprises signal conditioning circuitry, providing enhanced signal conditioning. Electrical and RF transition from one cavity to the other is implemented by a cavity transit assembly therebetween. The dual cavity, low power, outdoor combination line amplifier package for cable telecommunication systems according to claim 1, wherein the enhanced signal conditioning comprises automatic gain control, echo cancellation, predistortion, and telemetry.

The gain module heatsink cover may be detachably sealed on one side of the lower cavity by mounting bolts with a mesh gasket on the interfaces between the edge of the lower cavity and the edge of the gain module heatsink cover while the gain module PCB is able to quickly connect to or disconnect from the cavity transit assembly, so that the gain module PCB is able to be easily removed with the gain module heatsink cover for updating component thereon for change upper frequency of the RF signal groups without moving other PCBs or covers.

The passive PCB may be detachable and with interconnections arranged between the gain module PCB and the passive PCB so that the passive PCB is able to be removed in one piece without moving other PCBs or covers for rapid frequency split changes.

The conditioning circuitry may comprise an automatic gain control module for automatic gain control and slope control of RF signals, a digital predistortion module for processing predistortion of RF signals, an echo cancellation module for cancelling echo from RF signals, and a status monitor module for processing telemetry.

The status monitor module may process telemetry by collecting temperature and voltage data from the passive PCB and RF level data from the automatic gain control module.

The modules may be interconnected by a digital bus so that the modules are able to share and co-process information and collect sampled RF information from and feed the conditioned RF information to appropriate hardline ports and signal tap ports.

The cavity transit assembly may be swaged into the dual-cavity main frame and sealed with a conductive compound and planed flat, forming a continuous electrically conductive path and contiguous environmental sealing surface to traverse the RF and DC signal groups between cavities.

The present invention has several benefits when compared to prior art. First, the housing is sectioned into two cavities with electromagnetic, acoustic, and thermal isolations. This separation prevents indirect coupling of lightning surge arcover in surge protection devices, mutual coupling of heat being cast off from the AC power passing inductors, and coupling of acoustic vibrations from surge arresting to solder joints between the PCB and surface mounted ICs. The tap/amplifiers in the market put all components in one chamber and protection may not be available or be too expensive. Secondly, all functions are modularized with one PCB and an associated cover. When performing maintenance or upgrades, only needed part is removed from the tap-amplifier package for repair or replacement while others remain as they are. It doesn't have to disassemble the hosing of current tap/amplifiers and unscrew the screws to looking for one key component. Last, the amplifier package has similar size as the current tap/amplifiers. No more modification of the amplifier package to fit the space on existing installation lines.

DETAILED DESCRIPTION OF THE PREFERRED EMBODIMENTS

The present invention will now be described more specifically with reference to the following embodiments.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that several techniques and steps are disclosed. Each of these has individual benefit and each can also be used in conjunction with one or more, or in some cases, all of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

A dual cavity, low power and outdoor combination line amplifier package for cable telecommunication systems (Referred to as tap-amplifier package in the specification) comprising broadband signals from 5 MHZ to 3 GHz is discussed herein. In the following description, for the purposes of explanation, numerous specific details are set forth to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

Figure 1:
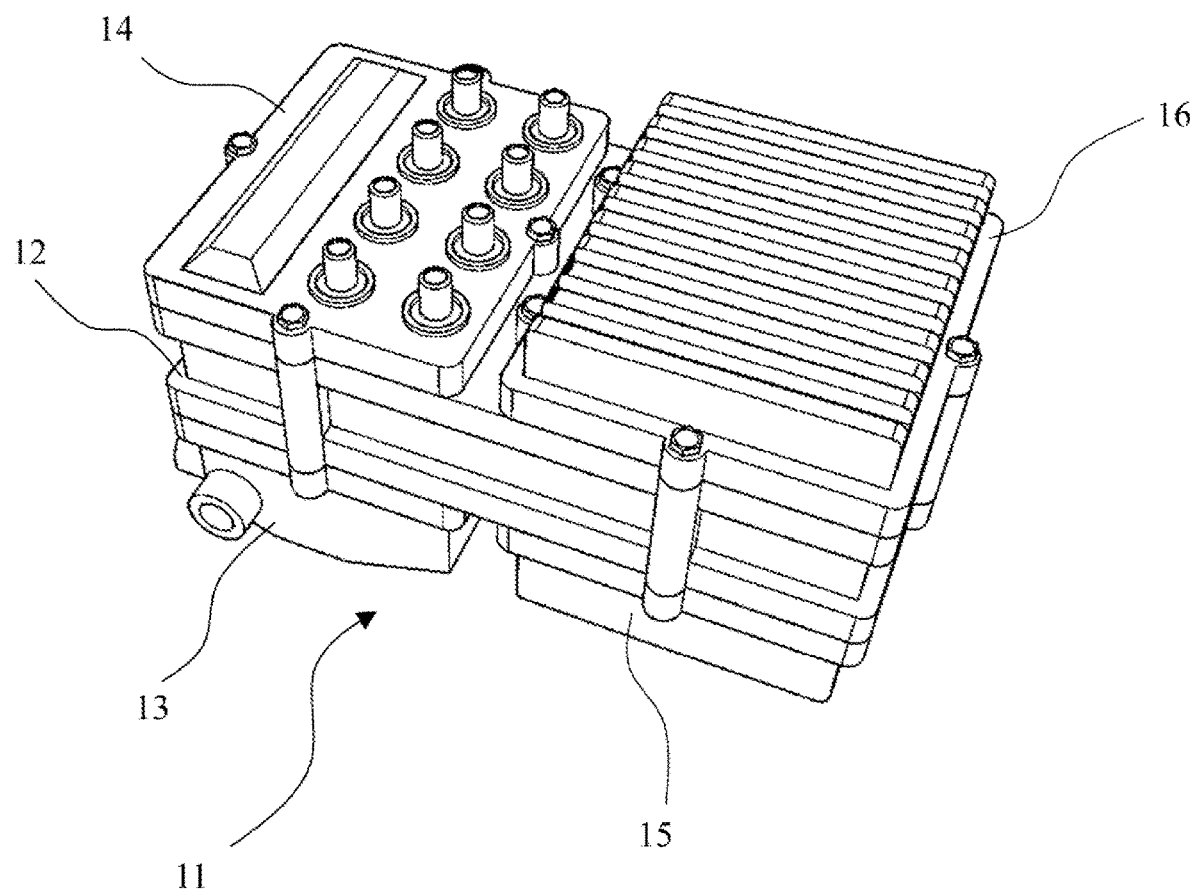
FIG. 1 shows a side view of the fully assembled present invention.
Figure 2:
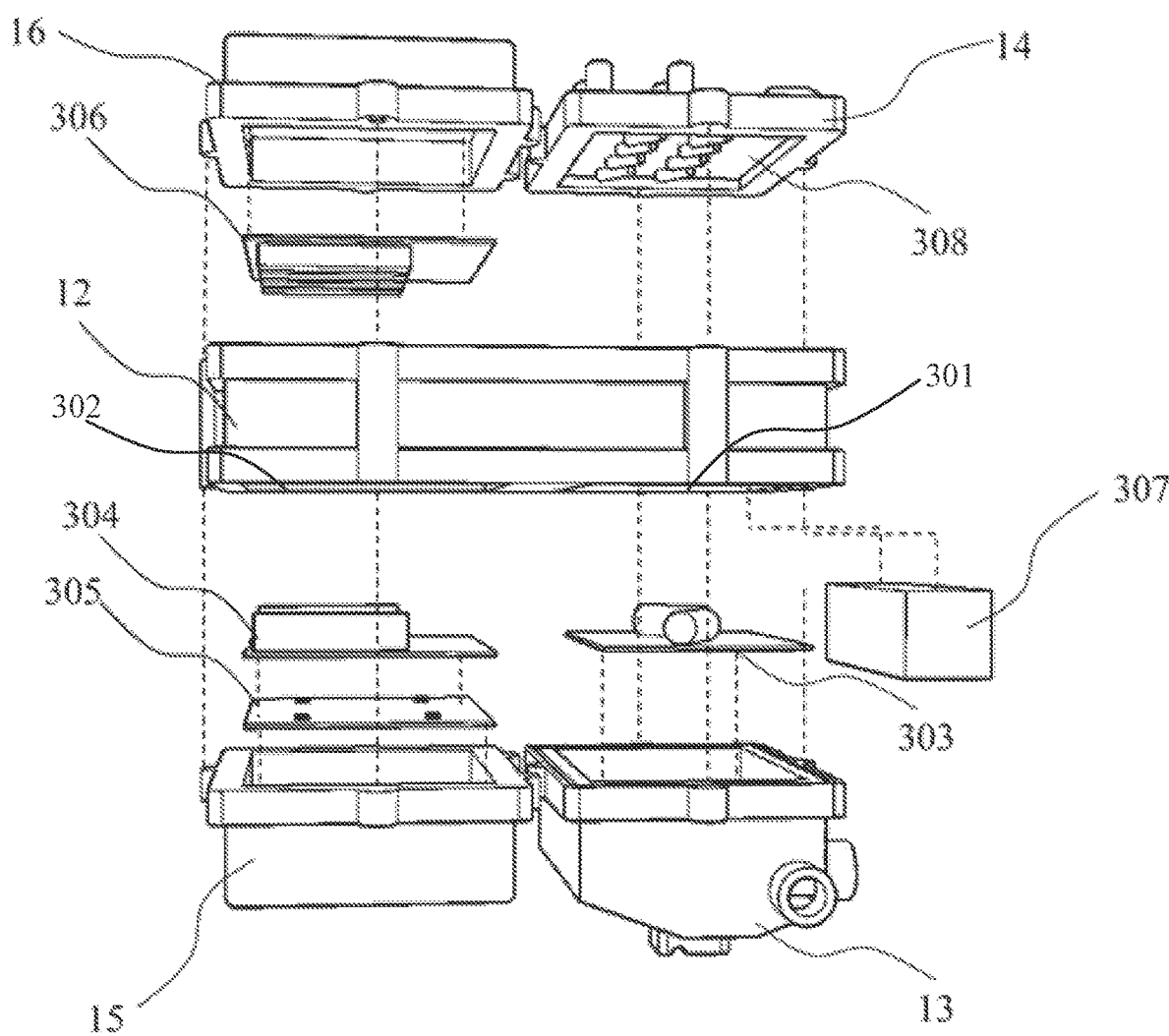
FIG. 2 shows an exploded view of the present invention.

The present invention will now be described by referencing the appended figures representing preferred embodiments. Please refer to FIG. 1 and FIG. 2. FIG. 1 depicts an example of a tap-amplifier housing 11 of the tap-amplifier package according to various embodiments of the present invention. It is a side view of the fully assembled present invention. FIG. 2 shows an exploded view of the present invention. The tap-amplifier housing 11 may comprise a dual-cavity main frame 12 which is cast in one piece and sectioned into two cavities: a lower cavity 302 and an upper cavity 301, as shown in FIG. 2. The lower cavity 302 is electrically and environmentally sealed by a gain module heatsink cover 15, and a smart app accessories cover 16. The upper cavity 301 is electrically and environmentally sealed by a hardline entry cover 13 and a tap plate cover 14. The purpose of the dual cavities 121 and 122 of the dual-cavity main frame 12 is to acoustically, magnetically, and thermally isolate the AC power magnetics from the RF semiconductors. To be precise, both the upper cavity 301 and the lower cavity 302 are electromagnetically enclosed chambers. For example, the lower cavity 302 may be electromagnetically enclosed by applying a conductive mesh gasket on the interfaces between the edge of the lower cavity 302 and the edge of the gain module heatsink cover 15 or the smart app accessories cover 16. In addition, since AC power goes through the upper cavity 301, the upper cavity 301 has lightning protection so that electrical surge will not damage or degrade the integrated circuits (ICs) in the PCBs in the lower cavity 302. A plurality of, up to four functionally specific, environmentally and electromagnetically sealed covers, e.g. the hardline entry cover 13, the tap plate cover 14, the gain module heatsink cover 15, and the smart app accessories cover 16 shown in FIG. 1 and FIG. 2, and in preferred embodiments can be affixed to a messenger strand via mounting clamp, and alternately, affixed to a mounting bracket via mounting bolt. In other embodiments, the tap-amplifier housing 11 may comprise between two and three covers with an alternative main frame, wherein the hardline entry cover 13 for hardline receptacle and the gain module heatsink cover 15 for rear module are cast in one piece along with the described embodiment of the dual-cavity main frame 12. In some further embodiments, the tap-amplifier housing 11 may have only a single, continuous front cover, with the front tap plate cover 14 and smart app accessories cover 16 being combined as one piece with the dual purpose of having both hardline tap receptacles and smart application modules in one piece.

In the embodiment, each cover 13, 14, 15, or 16, when opened, may be tethered to the dual-cavity main frame 12 by a conductive ground strap (not shown) which serves the dual purpose of providing a sound electrical ground path when the cover 13, 14, 15, or 16 is removed from the dual-cavity main frame 12 and further to retain the cover 13, 14, 15, or 16 while maintenance is being performed on the taps or amplifiers. Each cover 13, 14, 15, or 16 may have a set of threaded mounting holes inside for the purpose of mounting PCB 303, 304, 305, 306 and 308, each whose function is described in detail in the paragraphs that follow.

The block diagram in FIG. 11 discloses a signal flow and physical segmentation of the functions detailed in later paragraphs. The signal flow and functional blocks are found in the current art. However, the physical segmentation of the blocks and how that segmentation is achieved form a part of the claims within. A coaxial system carries forward broadband RF signals, reverse broadband RF signals, and AC power through a common hardline coaxial cable. The electrical signal and power group are available at both hardline ports and all signal tap ports. When the signal originates from the headend, it is referred to alternately as the forward signal and the downstream signal. When the signal originates from the subscriber end, it is referred to alternately as the reverse or upstream signal. All will be used in their appropriate alternate forms in describing the signal flow.

The AC power can be introduced from either a hardline input port 401 or a hardline output port 402 and can also be blocked or passed within a hardline receptacle PCB 303 via standard fuse 335 or a busbar. AC power is also passed from a hardline receptacle PCB 303 to an AC-to-DC power supply 307 and a tap plate PCB 308. The AC-to-DC power supply 307 and the standard fuse 335 are mounted on the hardline receptacle PCB 303. The tap plate PCB 308 and the hardline receptacle PCB 303 are electrically connected and fixed on the hardline entry cover 13 and the hardline entry cover 13 is able to electrically and environmentally seal on one side of the upper cavity 301.

Forward signals must be amplified and conditioned to overcome hardline cable losses, as well as the losses inherent in the division of the signal to deliver it to a plurality of subscribers. Signal conditioning is carried out in several stages, beginning with the separation of the AC and RF signal group at the hardline input port 401 and the hardline output port 402, followed by a forward input directional coupler 310 for sampling forward RF signal group, and by separation of the forward RF signal group from reverse RF signal group by way of a diplex filter 311. The Forward RF signal group, having been isolated from the AC and Reverse RF signal group, is then attenuated via a pad 312, such as a plug-in pad, a variable pad, or a digitally controlled pad, and corrected for excess negative slope introduced by a hardline coaxial cable via an equalizer circuit 313 which may also be plug-in, variable, or digitally controlled corresponding to the pad 312. Once the forward RF signal group has been preconditioned for amplification, the forward RF signal group is passed to an input stage pre-amplifier 315 to be amplified. Between the output of the input stage pre-amplifier 315 and the input of an output stage power amplifier 322, the forward RF signal group is further conditioned by a composite circuit that combines the function of automatic slope control and a bode correction circuit 316 to correct for both the tap-amplifier's change in response over temperature and the previous span of hardline cable's change in response over temperature. Main fixed positive slope and flatness corrections are then applied to the forward RF signal group in a trim board 317. The forward RF signal group then passes through an interstage equalizer 318, where the customer can adjust the slope correction to a value other than the default value defined by the trim board 317. The tap-amplifier's gain can be adjusted for precision via an interstage pad 319. For additional isolation between the forward and reverse RF signal groups, the forward RF signal group is further conditioned by a high pass filter 320. The forward RF signal group then passes through the output stage power amplifier 322 and an output diplex filter 323, where the fully conditioned and amplified forward RF signal group is recombined with the reverse RF signal group. The forward RF signal group passes through the lower cavity 302 to the upper cavity 301 where it is coupled down to the tap ports via a directional coupler 324, a multi-function splitter 333, and a distribution splitter 334 on the tap plate PCB 308. In the through branch of the directional coupler 324, the RF signal group is recombined with AC at the AC/RF circuit 325 and finally passed to the hardline output port 402.

Reverse signals must be amplified and conditioned to overcome hardline cable losses, as well as the losses inherent in the combining of the signals originating from a plurality of subscribers from both the tap ports of the distribution splitter 334 and those connected downstream via the hardline output port 402. Signal conditioning is carried out in several stages, beginning with the separation of the AC and RF signal group at the AC/RF circuit 325, followed by separation of the reverse RF signal group from forward RF signal group by way of the output diplex filter 323. The reverse RF signal group, having been isolated from the AC and forward RF signal group, is then attenuated via a pad 326, such as a plug-in pad, a variable pad, or a digitally controlled pad, and corrected for flatness and diplex filter roll-off by way of a reverse trim board 340. The reverse RF signal group then passes through a low pass filter 328 which further isolates the reverse RF signal group from the forward RF signal group. The reverse RF signal group then passes through a reverse gain block 329 and through an output balance pad 330. The reverse RF signal group is further conditioned by a thermal gain control circuit 331 that combines the function of thermally determined slope control, and the bode correction circuit 316 to correct for both change of a tap-amplifier reverse gain block 329 in response over temperature as well as an estimate of the next upstream span's change in attenuation over temperature. The reverse RF signal group is then recombined with the forward RF signal group via the diplex filter 311 and then recombined with AC via an AC/RF circuit 309. The fully conditioned and recombined signal is then passed upstream via the hardline input port 401.

A smart access cover PCB 306 contains modules for enhanced signal conditioning of the forward and reverse signals, e.g., for automatic gain control, echo cancellation, predistortion, and telemetry. The primary application is the smart automatic gain control module 338, which collects a full spectral representation from the multi-function splitter 333 and digitizes it so that it can determine level and slope correction to be applied to the bode correction circuit 316. The digitized output signal sample is available to an echo cancellation module 339, the digital predistortion module 337, and the status monitor module 336 for unique processing according to their functions. The echo cancellation module 339 collects a sample of the forward RF signal sample within a certain range via a forward input coupler 314. It further collects data from a reverse directional coupler 327 to process the level of echo cancellation required and provides the echo cancellation signals via an open jumpers A or B. The status monitor module 336 receives a reverse RF signal sample via the reverse directional coupler 327 and a reverse sample splitter 342 (shown on FIG. 9). Meanwhile, the status monitor module 336 processes telemetry by collecting temperature and voltage data from the passive PCB 304 and RF level data from the automatic gain control module 338. The digital predistortion module 337 processes the forward RF signal sample from the digitized smart automatic gain control module 338 and sends a correction signal to the input of the output stage power amplifier 322 via an insertion directional coupler 321.

Figure 11:
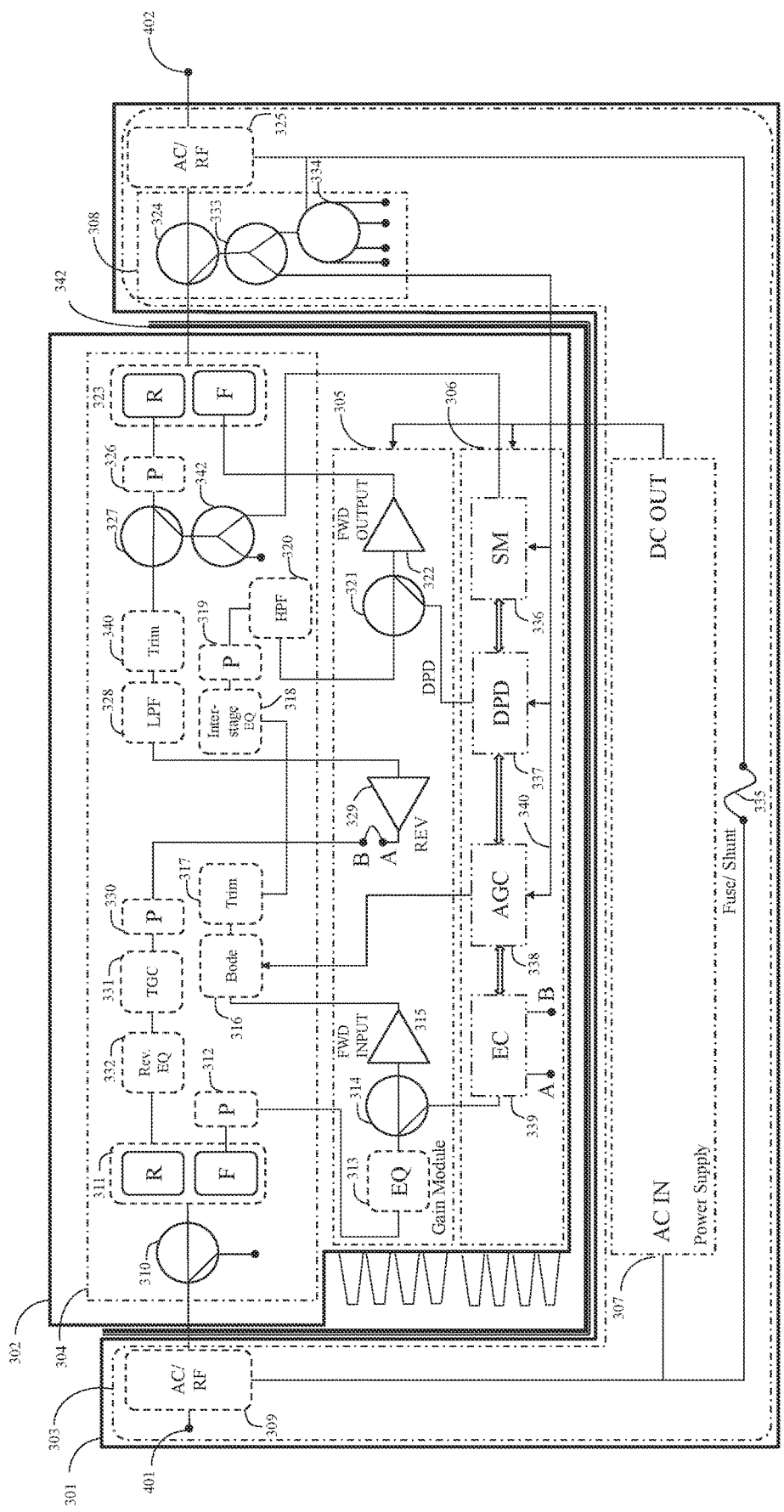
FIG. 11 shows a block diagram of the entire embodiment of the invention.

For the mechanical assembly, FIG. 2 is an exploded view of the invention showing the physical construction of the block diagram of FIG. 11. The dual-cavity main frame 12 is further detailed in FIG. 9 to show the cavity transit assembly 342 that conducts the RF and electrical, and power signals between the upper and lower cavities. The AC-to-DC power supply 307 is mounted into the upper cavity 301 of the dual-cavity main frame 12 via a screw and bracket assembly affixed to the cavity inner wall. The AC power is conducted from the hardline receptacle PCB 303 and the tap plate PCB 308 via a wiring harness. DC power is conducted from the AC-to-DC power supply 307 to the cavity transit assembly 342 via PCB interconnect. The hardline receptacle PCB 303 is affixed on the hardline entry cover 13 with the AC-to-DC power supply 307 mounted thereon by using a system of screws and cast-in mounting standoffs. The tap plate PCB 308 is mounted to the tap plate cover 14 via swaged in, environmentally sealed F-81 connectors augmented by a system of screws and cast-in mounting standoffs.

The gain module PCB 305 is mounted to the gain module heatsink cover 15 by a system of screws and cast-in mounting standoffs. Each amplifier IC on the gain module PCB 305 is in metal-to-metal contact with the gain module heatsink cover 15 via raised features cast into the mounting face of the gain module heatsink cover 15 and precision polished. Thermal contact between the metal-to-metal surfaces is achieved with heatsink compound. The gain module PCB 305 is connected to a passive PCB 304 via a 6-position RF interconnection header. The passive PCB 304 is mounted to the gain module PCB 305 via a system of grounding pins and sockets. Thus, the gain module PCB 305 and the passive PCB 304 are fixed on the gain module heatsink cover 15, and the gain module heatsink cover 15 is able to electrically and environmentally seal on one side of the lower cavity 302. The passive PCB 304 is connected to the cavity transit assembly 342 via a 2-position RF header assembly which is additionally furnished with interconnections for DC power. The passive PCB 304 separates, equalizes, filters and recombines RF signal groups in the downstream and upstream.

The smart access cover PCB 306 is affixed to the smart app accessories cover 16 via a system of screws and cast-in mounting standoffs and the smart app accessories cover 16 is able to electrically and environmentally seal on the other side of the lower cavity 302. The smart access cover PCB 306 is connected to the gain module PCB 305 via a 3-position RF header which is, in turn, connected to a 3-position headered coaxial cable assembly which is, in turn connected to the mating PCB via a 3-position RF header. DC power is supplied from the AC-to-DC power supply 307 to the smart access cover PCB 306 via coupled one or more wires. The smart access cover PCB 306 comprises signal conditioning circuitry, providing enhanced signal conditioning. Physically, the conditioning circuitry comprises the automatic gain control module 308 for automatic gain control and slope control of RF signals, the digital predistortion module 337 for processing predistortion of RF signals, the echo cancellation module 339 for cancelling echo from RF signals, and the status monitor module 336 for processing telemetry. The modules may be added in common form factor modules as needed by the end user. The modules are interconnected by a digital bus 340 so that the modules are able to share and co-process information and collect sampled RF information from and feed the conditioned RF information to appropriate hardline ports and signal tap ports. Power sampling signals are conducted to the gain module PCB 305 via the cavity transit assembly 342.

Figure 3:
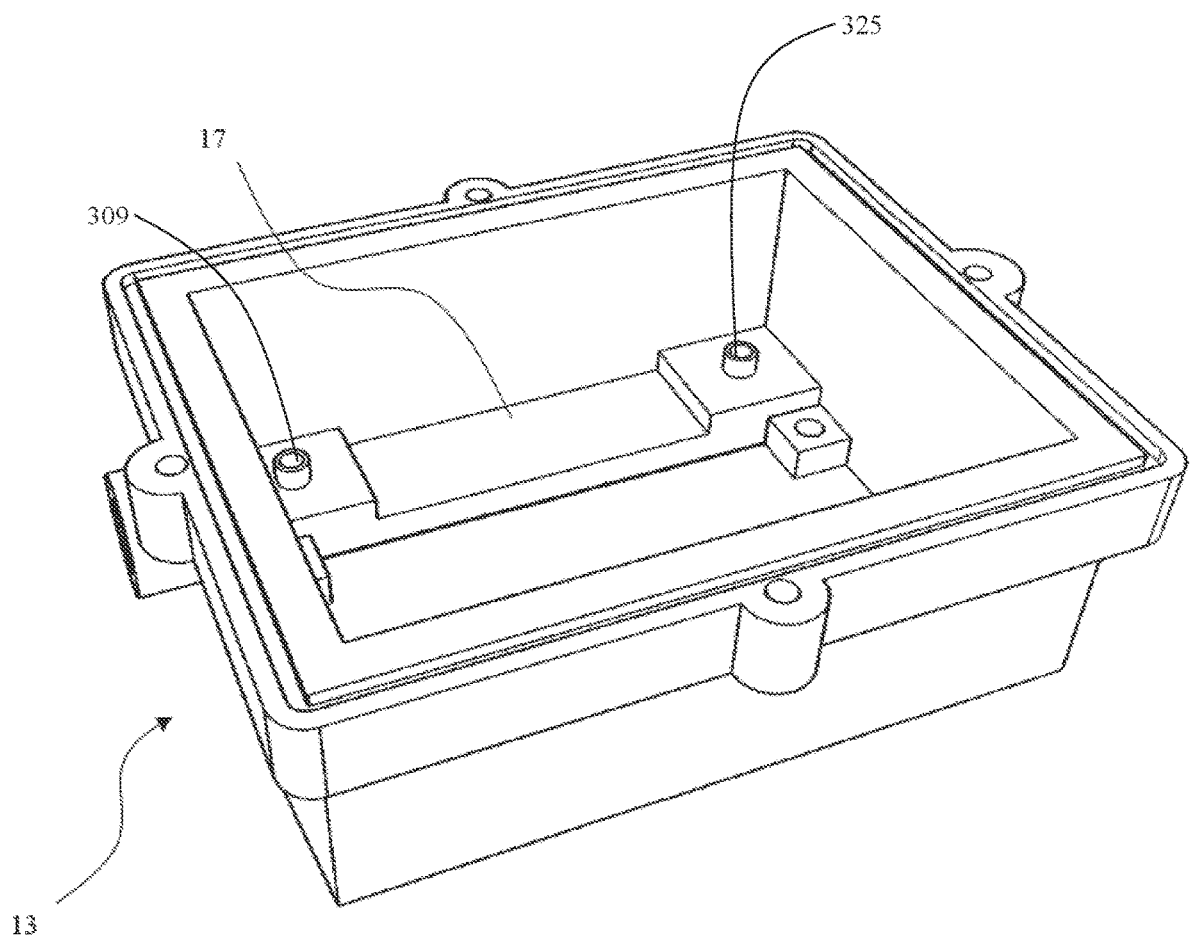
FIG. 3 shows a hardline entry cover.

FIG. 3 shows the hardline entry cover 13 with a connector stinger receiver bushing assembly 17, where the center conductor of the hardline coax is secured with a circumferential contact stinger receiver on the input and output. The stinger receiver bushing assembly 17 can be configured to accept the hardline from the vertical port entries or the horizontal port entries. The connector stinger receiver bushing assembly 17 contains the AC/RF circuit 309 and the AC/RF circuit 325 therein. Although the hardline receptacle PCB 303 is removed from the hardline entry cover 13, from the description about the block diagram above and FIG. 11, the hardline receptacle PCB 303 comprises AC, RF, and pass-through circuitry, providing electrical connection to coaxial cables in the downstream direction and the upstream direction to receive and transmit RF signal groups.

Figure 4:
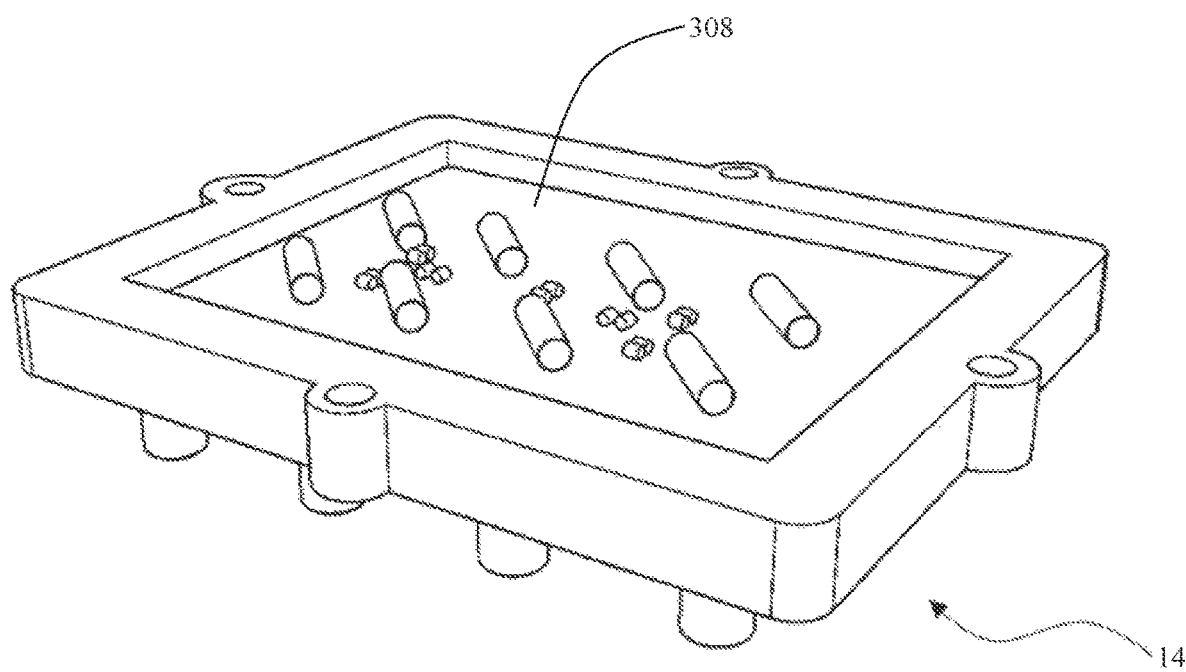
FIG. 4 shows a front tap plate cover.

FIG. 4 depicts the front tap plate cover 14 with the circuit side facing up and mounted with the F-81 tap ports facing downward. Thus, the tap plate cover 14 is able to electrically and environmentally seal on the other side of the upper cavity 301 with the taps facing externally. The circuit side roughly depicts the locations of the AC chokes whose purpose is to couple accessory AC power to the tap ports. Based on the description about the block diagram above and FIG. 11, the tap plate PCB 308 mounted to the tap plate cover 14 comprises AC accessory, to take samples of RF signal groups and dividing them over a plurality of subscriber ports in the downstream direction, and combines RF signal groups from a plurality of subscriber ports and couples the combined RF signal groups to a main RF signal port in the upstream direction.

Figure 5:
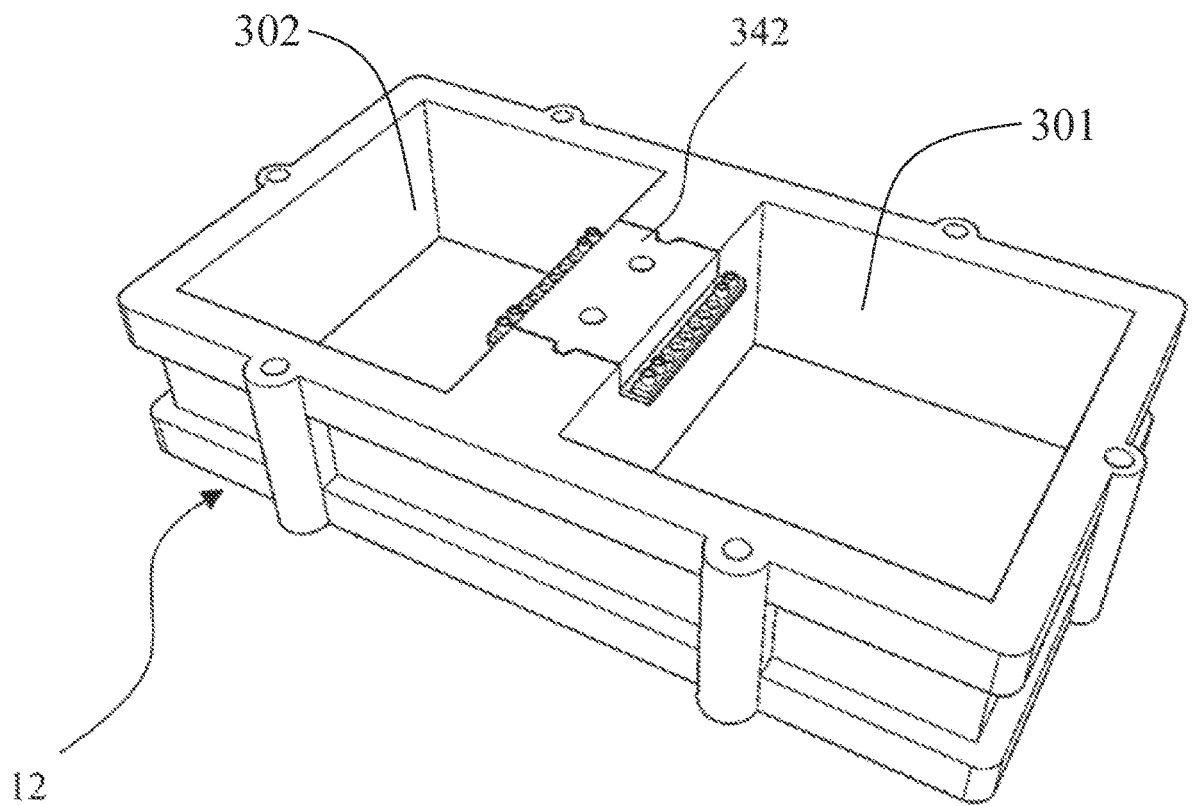
FIG. 5 shows a dual-cavity main frame.

FIG. 5 shows the dual-cavity main frame 12 as described in detail above. Circuits in the lower cavity 302 and the upper cavity 301 are electrically connected by the cavity transit assembly 342. According to the embodiment, the cavity transit assembly 342 is swaged into the dual-cavity main frame 12 and sealed with a conductive compound and planed flat, forming a continuous electrically conductive path and contiguous environmental sealing surface for traverse the RF and DC signal groups between the upper cavity 301 and the lower cavity 302. According to the present invention, one cavity is electromagnetically, acoustically, and thermally isolated from the other. For electromagnetic isolation, it is available through the combination of the metal material for the dual-cavity main frame 12, mesh gaskets 15, and the cavity transit assembly 342. The cavity transit assembly 342 contains feedthrough filters to pass the DC power between cavities. The routing of RF traces is accomplished by having the outer layers of its PCB as grounding with the inner trace containing the center conductors. These are common technology in the field of the present invention. For acoustical isolation, when a lightning surge comes, it will cause the AC chokes to ring. That mechanical stress is normally coupled to the gain module PCB 305 if those circuits share the same PCB. For thermal isolation, the two cavities are thermally isolated in that the AC power chokes that normally induce heat into the ICs do not share the same cavity. The ICs are on a heat sink plane entirely isolated from the AC power.

Figure 6:
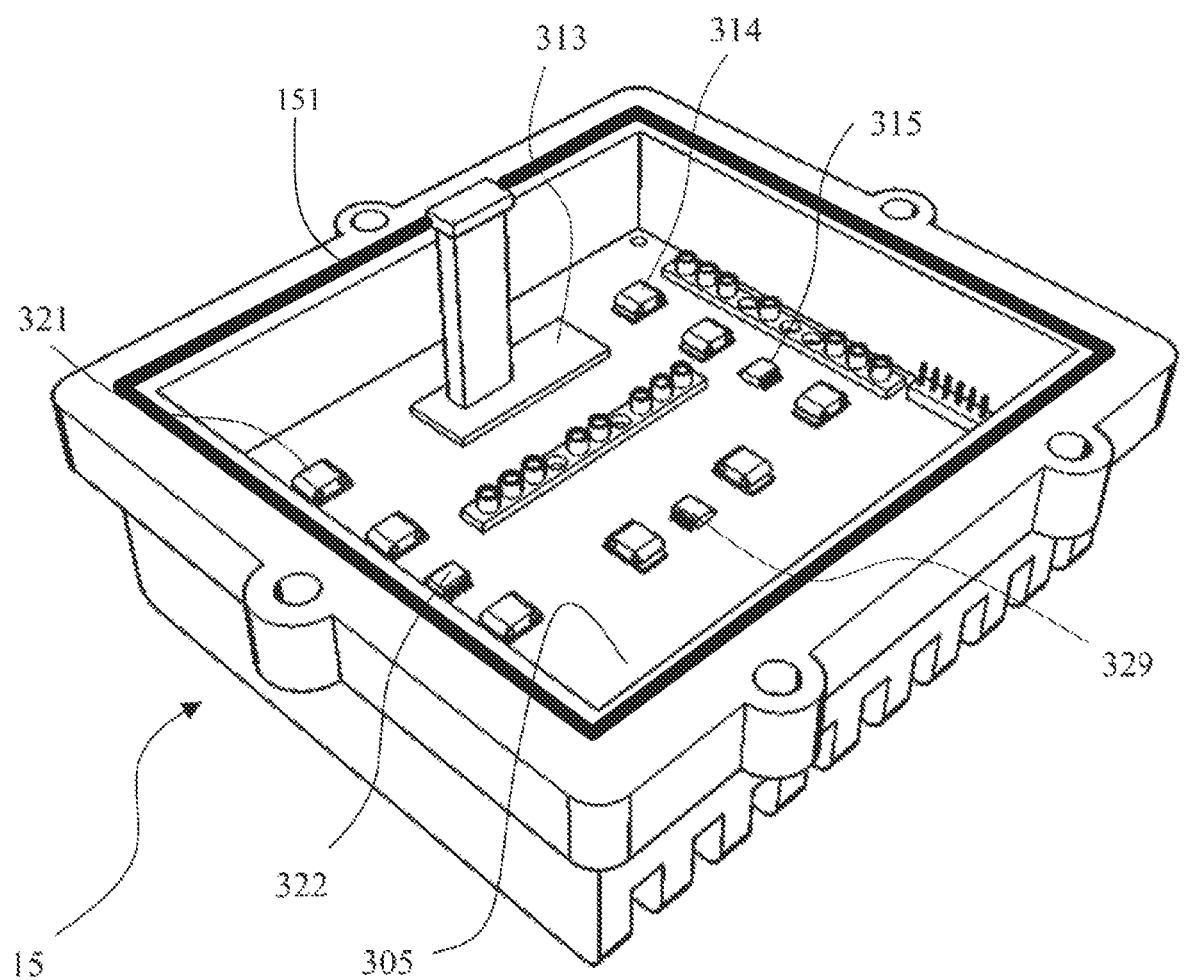
FIG. 6 shows a gain module PCB mounted in a gain module heatsink cover.

FIG. 6 shows the gain module PCB 305 where the gain module PCB 305 is mounted in a gain module heatsink cover 15. The gain module heatsink cover 305 is removable, weather sealed and electromagnetically sealed on one side of the lower cavity 302 by mounting bolts with a mesh gasket 151 on the interfaces between the edge of the lower cavity 302 and the edge of the gain module heatsink cover 15 while the gain module PCB 305 is able to quickly connect to or disconnect from the cavity transit assembly 342, so that the gain module PCB 305 is able to be easily removed with the gain module heatsink cover 15 for updating component thereon to change the upper frequency of the RF signal groups without moving other PCBs or covers. From the description about the block diagram above and FIG. 11, it is obvious that the gain module PCB 305 comprises gain circuitry, providing amplification of the RF signal groups in both downstream and upstream. It should be emphasized that the passive PCB 304 is removable, weather sealed, electromagnetically sealed and connected to the gain module PCB 305 so that the passive PCB 304 is able to be removed in one piece without moving other PCBs or covers for rapid frequency split changes.

Figure 7:
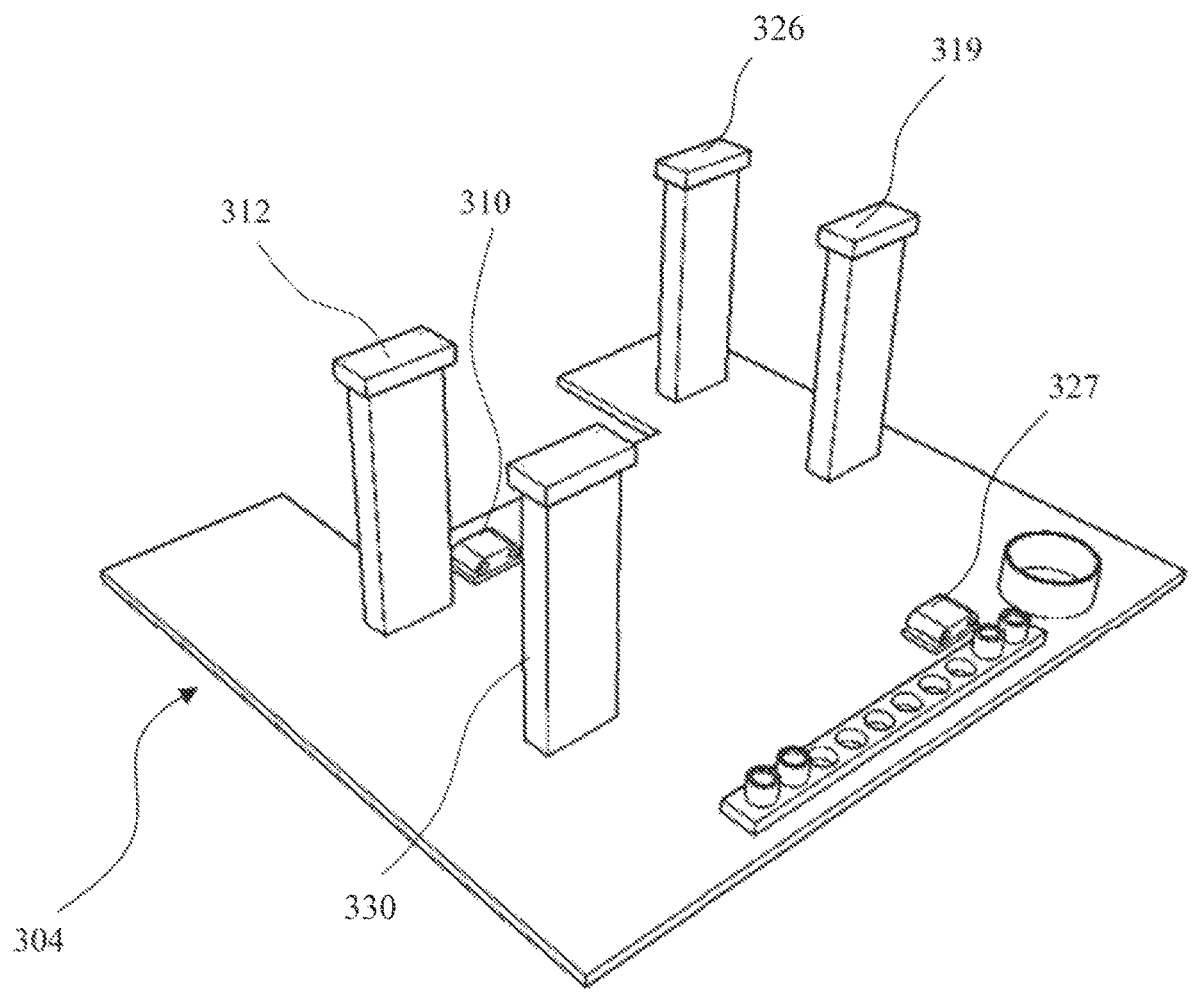
FIG. 7 shows a passive PCB.

FIG. 7 depicts the passive PCB 304 described in detail above.

Figure 8:
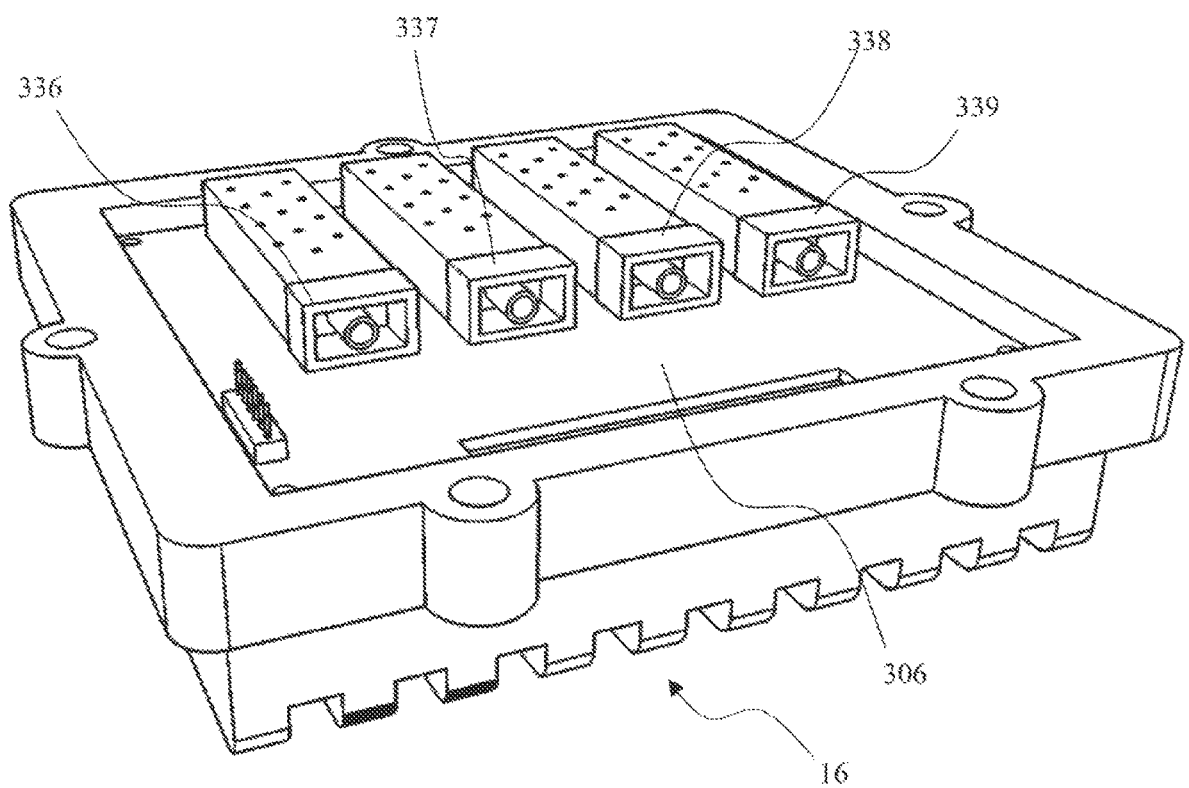
FIG. 8 shows a smart app accessories cover.

FIG. 8 depicts the smart access cover PCB 306 installed in the smart app accessories cover 16. In this embodiment, the modules 336-339 are in industry standard SFP (Small Form-Factor Pluggable) modules with the front port being an RF connector, such as an industry standard sub-miniature type B (SMB) instead of the typical optical connector usually found in this location.

Figure 9:
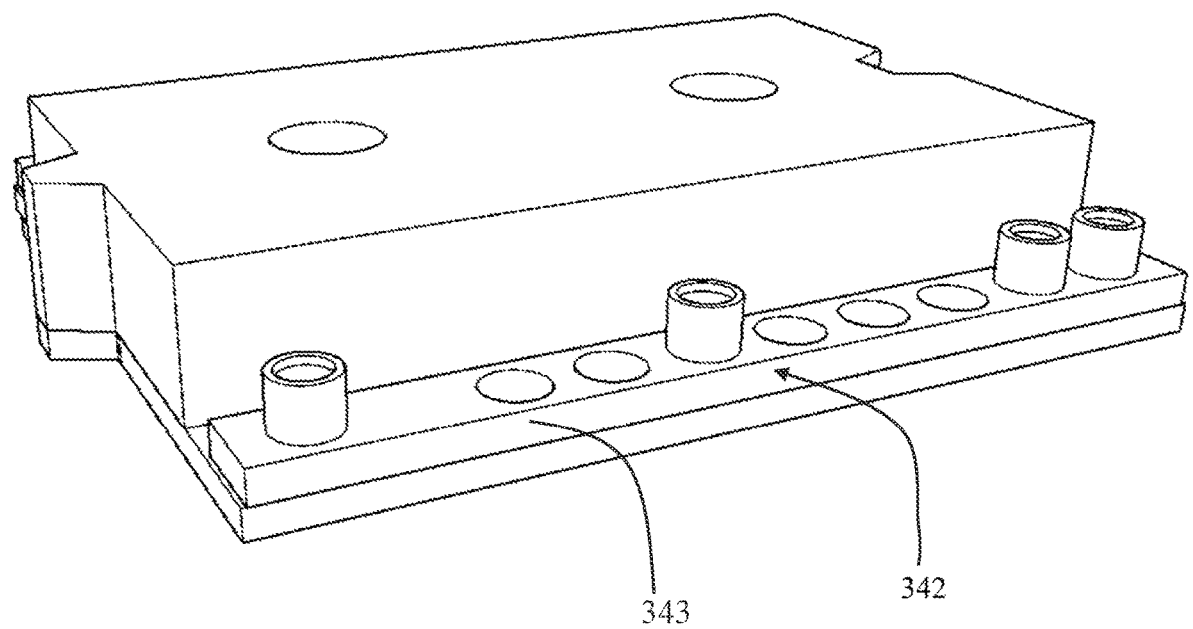
FIG. 9 shows a cavity transit assembly.

FIG. 9 depicts the cavity transit assembly 342. Electrical and RF transition from one cavity to the other is implemented by the cavity transit assembly between the cavities via a connecting bus for quick connecting RF, power, and signal.

Figure 10:
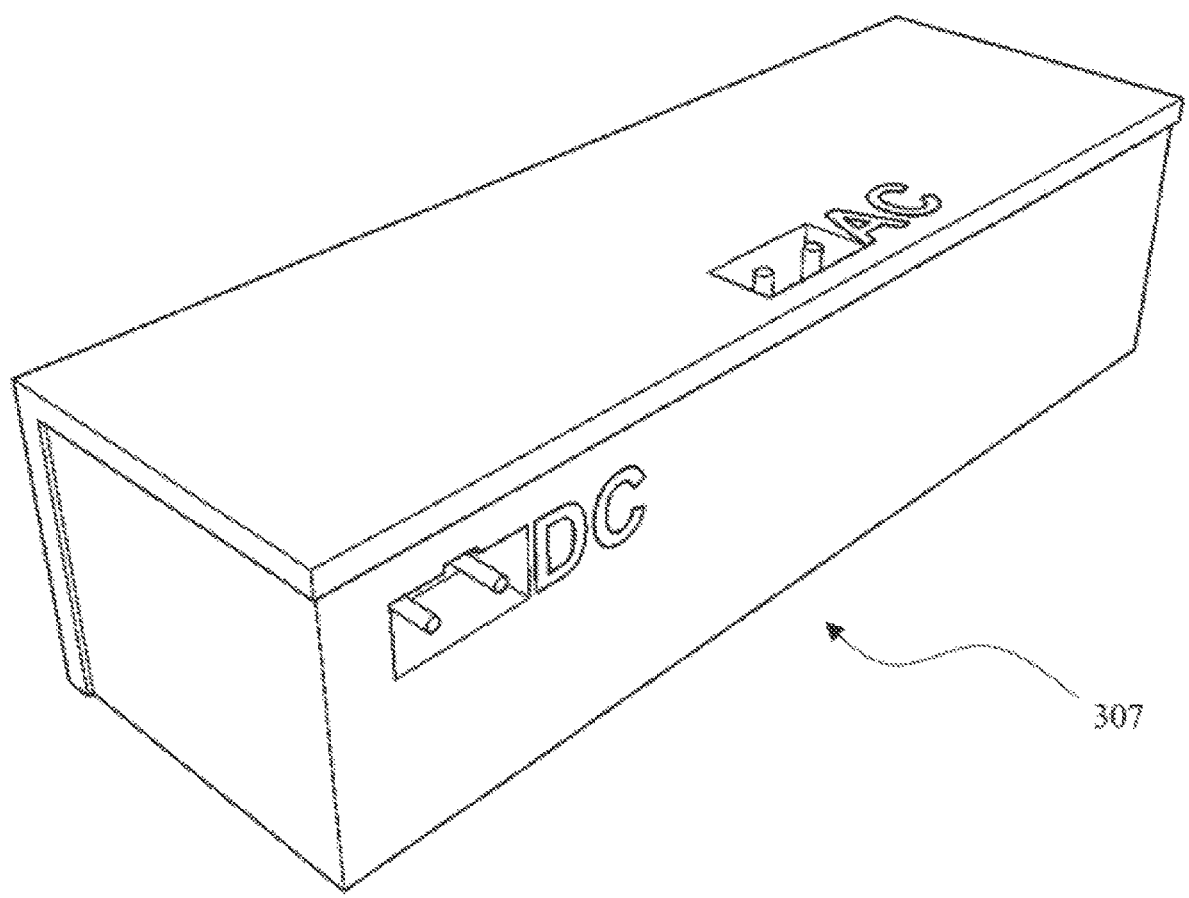
FIG. 10 shows a power supply module.

FIG. 10 depicts the AC-to-DC power supply 307 module.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A dual cavity, low power, outdoor combination line amplifier package for cable telecommunication systems, comprising:
   a dual-cavity main frame, cast in one piece and sectioned into an upper cavity and a lower cavity;
   a hardline entry cover, having a hardline receptacle PCB with a power supply fixed thereon, electrically and environmentally sealing on one side of the upper cavity;
   a tap plate cover, having a tap plate PCB fixed thereon and mounted with a plurality of taps, electrically and environmentally sealing on the other side of the upper cavity with the taps facing externally;
   a gain module heatsink cover, having a gain module PCB and a passive PCB fixed thereon, electrically and environmentally sealing on one side of the lower cavity; and
   a smart app accessories cover, having a smart access cover PCB fixed thereon, electrically and environmentally sealing on the other side of the lower cavity,
   wherein one cavity is electromagnetically, acoustically, and thermally isolated from the other;
   the hardline receptacle PCB comprises AC, RF, and pass-through circuitry, providing electrical connection to coaxial cables in the downstream direction and the upstream direction to receive and transmit RF signal groups;
   the tap plate PCB comprises AC accessory, taking samples of RF signal groups and dividing them over a plurality of subscriber ports in the downstream direction, and combining RF signal groups from a plurality of subscriber ports and coupling the combined RF signal groups to a main RF signal port in the upstream direction;

the gain module PCB comprises gain circuitry, providing amplification of the RF signal groups in both downstream and upstream;

the passive PCB separates, equalizes, filters and recombines RF signal groups in the downstream and upstream;

the smart access cover PCB comprises signal conditioning circuitry, providing enhanced signal conditioning;

electrical and RF transition from one cavity to the other is implemented by a cavity transit assembly therebetween.

2. The dual cavity, low power, outdoor combination line amplifier package for cable telecommunication systems according to claim 1, wherein the enhanced signal conditioning comprises automatic gain control, echo cancellation, predistortion, and telemetry.

3. The dual cavity, low power, outdoor combination line amplifier package for cable telecommunication systems according to claim 1, wherein the gain module heatsink cover is detachably sealed on one side of the lower cavity by mounting bolts with a mesh gasket on the interfaces between the edge of the lower cavity and the edge of the gain module heatsink cover while the gain module PCB is able to quickly connect to or disconnect from the cavity transit assembly, so that the gain module PCB is able to be easily removed with the gain module heatsink cover for updating component thereon for change upper frequency of the RF signal groups without moving other PCBs or covers.

4. The dual cavity, low power, outdoor combination line amplifier package for cable telecommunication systems according to claim 1, wherein the passive PCB is detachable and with interconnections arranged between the gain module PCB and the passive PCB so that the passive PCB is able to be removed in one piece without moving other PCBs or covers for rapid frequency split changes.

5. The dual cavity, low power, outdoor combination line amplifier package for cable telecommunication systems according to claim 2, wherein the conditioning circuitry comprises an automatic gain control module for automatic gain control and slope control of RF signals, a digital predistortion module for processing predistortion of RF signals, an echo cancellation module for cancelling echo from RF signals, and a status monitor module for processing telemetry.

6. The dual cavity, low power, outdoor combination line amplifier package for cable telecommunication systems according to claim 5, wherein the status monitor module processes telemetry by collecting temperature and voltage data from the passive PCB and RF level data from the automatic gain control module.

7. The dual cavity, low power, outdoor combination line amplifier package for cable telecommunication systems according to claim 5, wherein the modules are interconnected by a digital bus so that the modules are able to share and co-process information and collect sampled RF information from and feed the conditioned RF information to appropriate hardline ports and signal tap ports.

8. The dual cavity, low power, outdoor combination line amplifier package for cable telecommunication systems according to claim 1, wherein the cavity transit assembly is swaged into the dual-cavity main frame and sealed with a conductive compound and planed flat, forming a continuous electrically conductive path and contiguous environmental sealing surface to traverse the RF and DC signal groups between cavities.

* * * * *